United States Patent
Cao et al.

(10) Patent No.: US 10,171,554 B2
(45) Date of Patent: *Jan. 1, 2019

(54) DISTRIBUTING SUBSCRIBER DATA IN A MOBILE DATA NETWORK

(71) Applicant: International Business Machines Corporation, Armonk, NY (US)

(72) Inventors: Bin Cao, Rochester, MN (US); James E. Carey, Rochester, MN (US); Kirubel Z. Seifu, Addis Ababa (ET)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,665

(22) Filed: Jan. 14, 2017

(65) Prior Publication Data

US 2017/0134475 A1    May 11, 2017

Related U.S. Application Data

(63) Continuation of application No. 14/739,358, filed on Jun. 15, 2015, now Pat. No. 9,578,489.

(51) Int. Cl.
| | |
|---|---|
| *H04M 3/42* | (2006.01) |
| *H04L 29/08* | (2006.01) |
| *H04W 8/20* | (2009.01) |
| *H04L 12/24* | (2006.01) |
| *H04L 12/58* | (2006.01) |

(52) U.S. Cl.
CPC .......... *H04L 67/04* (2013.01); *H04L 41/0803* (2013.01); *H04W 8/20* (2013.01); *H04L 51/14* (2013.01); *H04L 51/18* (2013.01); *H04L 51/38* (2013.01)

(58) Field of Classification Search
CPC ....... H04L 67/04; H04L 4/0803; H04L 51/14; H04L 51/38; H04L 51/18; H04W 8/20
See application file for complete search history.

(56) References Cited

U.S. PATENT DOCUMENTS

| | | |
|---|---|---|
| 2006/0156209 A1 | 7/2006 | Matsuura et al. |
| 2010/0261488 A1 | 10/2010 | Little et al. |
| 2011/0314035 A1 | 12/2011 | Brunet et al. |
| 2012/0233273 A1* | 9/2012 | Miner ..................... H04L 51/14 709/206 |
| 2013/0029652 A1 | 1/2013 | Nakrani et al. |

(Continued)

OTHER PUBLICATIONS

Cao et al., "Querying Data From Devices in an Ad-Hoc Network" U.S. Appl. No. 15/598,178, filed May 17, 2017.

(Continued)

*Primary Examiner* — Barry W Taylor
(74) *Attorney, Agent, or Firm* — Martin & Associates, LLC; Derek P. Martin

(57) ABSTRACT

A mobile data network supports making subscriber data addressable as devices in a mobile data network. Each data chunk is assigned a device address in the mobile data network. The data chunk can then be addressed as a device in the mobile data network. Data chunks corresponding to a subscriber are distributed across multiple devices in the mobile data network. The location of the subscriber's data chunks is tracked by the subscriber's mobile device and also by a tracking table in the mobile data network.

10 Claims, 8 Drawing Sheets

(56) References Cited

U.S. PATENT DOCUMENTS

| | | |
|---|---|---|
| 2014/0032468 A1 | 1/2014 | Anandaraj |
| 2015/0178310 A1* | 6/2015 | Fellner ............... G06F 3/065 |
| | | 711/154 |
| 2015/0349875 A1 | 12/2015 | Lauer et al. |

OTHER PUBLICATIONS

Appendix P—List of IBM Patents or Patent Applications Treated as Related, dated Jun. 15, 2017.

Nordstrom et al, "A Search-based Network Architecture for Mobile Devices", Department of Information Technology, Uppsala University, Sweden, Tech. Rep 3, 2009.

IBM, "Bharti to jump-start Africa's mobile communications", Sep. 17, 2010.

Documents to Go, "Work from anywhere: View, edit, and create MS Office, PDF files, and more on iOS.", printed Oct. 14, 2014.

Yoneki, Eiko, "ECCO: Data centric asynchronous communication", University of Cambridge, Computer Laboratory, Technical Report No. 677, UCAM-CL-TR-677, ISSN 1476-2986, Dec. 2006.

Eckel, Erik, "Four of the best cloud-based services for sharing files between Apple devices", Feb. 19, 2014.

McKinsey & Company, "Lions go digital: The Internet's transformative potential in Africa", Nov. 2013.

Esler et al., "Next Century Challenges: Data-Centric Networking for Invisible Computing", Proceedings of the 5th annual ACM/IEEE international conference on Mobile computing and networking. ACM, 1999.

Ananthanarayanan et al., "StarTrack: A Framework for Enabling Track-Based Applications", Microsoft Research, Jun. 22, 2009.

Mao et al. "The Case for a Unified Extensible Data-centric Mobility Infrastructure", Proceedings of 2nd ACM/IEEE international workshop on Mobility in the evolving internet architecture. ACM, 2007.

Steudi et al., "WhereStore: Location-based Data Storage for Mobile Devices Interacting with the Cloud", MCS'10, Jun. 15, 2010.

Cao et al., "Making Subscriber Data Addressable as a Device in a Mobile Data Network" U.S. Appl. No. 14/739,223, filed Jun. 15, 2015.

Cao et al., "Distributing Subscriber Data in a Mobile Data Network" U.S. Appl. No. 14/739,358, filed Jun. 15, 2015.

Cao et al., "Distributing Subscriber Data in a Mobile Data Network" U.S. Appl. No. 14/140,095, filed Jun. 15, 2015.

Cao et al., "Scaling Storage Capability for Subscriber Data Across Multiple Devices and Device Types in a Mobile Data Network" U.S. Appl. No. 14/739,461, filed Jun. 15, 2015.

Cao et al., "Scaling Storage Capability for Subscriber Data Across Multiple Devices and Device Types in a Mobile Data Network" U.S. Appl. No. 14/740,128, filed Jun. 15, 2015.

Cao et al., "Querying Data From Devices in an Ad-Hoc Network" U.S. Appl. No. 14/739,546, filed Jun. 15, 2015.

Cao et al., "Querying Data From Devices in an Ad-Hoc Network" U.S. Appl. No. 14/140,156, filed Jun. 15, 2015.

Cao et al., "Making Subscriber Data Addressable as a Device in a Mobile Data Network" U.S. Appl. No. 14/739,945, filed Jun. 15, 2015.

Cao et al., "Making Subscriber Data Addressable as a Device in a Mobile Data Network" U.S. Appl. No. 15/404,843, filed Jan. 12, 2017.

Appendix P—List of IBM Patents or Patent Applications Treated as Related, dated Mar. 1, 2017.

Cao et al., "Making Subscriber Data Addressable as a Device in a Mobile Data Network" U.S. Appl. No. 15/633,714, filed Jun. 26, 2017.

Appendix P—List of IBM Patents or Patent Applications Treated as Related, dated Jul. 15, 2017.

* cited by examiner

DISTRIBUTING SUBSCRIBER DATA IN A MOBILE DATA NETWORK

BACKGROUND

1. Technical Field

This disclosure generally relates to mobile data networks, and more specifically relates to distributing subscriber data across multiple devices in a mobile data network.

2. Background Art

Mobile phones have evolved into "smart phones" that allow a subscriber not only to make a call, but also to access data, such as e-mails, the internet, etc. Mobile phone networks have evolved as well to provide the data services that new mobile devices require. For example, 3G and 4G networks cover most of the United States, and allow subscribers high-speed wireless data access on their mobile devices. In addition, phones are not the only devices that can access mobile data networks. Many mobile phone companies provide equipment and services that allow a subscriber to plug a mobile access card into a Universal Serial Bus (USB) port on a laptop computer, and provide wireless internet to the laptop computer through the mobile data network. In addition, some newer mobile phones allow the mobile phone to function as a wireless hotspot, which supports connecting several laptop computers or other wireless devices to the mobile phone, which in turn provides data services via the mobile data network. As time marches on, the amount of data served on mobile data networks will continue to rise exponentially.

Most data transfers in a mobile data network are initiated by a subscriber. One way for a subscriber to initiate a data transfer is to send an e-mail, or to invoke a web page. There have been some attempts at making data transfers across mobile devices data-centric. One form of data-centric communication uses a publish-subscribe model, which allows subscribers to sign up for data. When a data source publishes data, the data is sent to all subscribers who have signed up for the data. The advantage of this type of data-centric communication is the data can be exchanged without the publisher knowing anything about the subscribers (other than where to deliver the data) and without the subscribers knowing anything about the publisher (other than how to sign up for the data). Instead both publishers and subscribers focus on what the data is as inscribed in the definition of the data.

Internet-based services have arisen that allow a user to store a large amount of the user's data in the cloud. Cloud-based services take advantage of storage and processing capacity that is both readily available and easily expandable in the cloud. While these Internet-based services can be used by subscribers of a mobile data network, these services are cloud-based and are not provided within a mobile data network. Thus, the problem of storing subscriber data in a mobile data network remains largely unsolved. Data-centric communication in mobile data networks has not caught on due to the lack of known mapping between subscribers and data, due to a lack of scalable storage capability across the mobile data network, and due to the lack of service with continuous infrastructure connectivity. While known mobile data networks can be used as a conduit for accessing cloud-based storage for subscribers, known mobile data networks do not offer support for storing subscriber data in the mobile data network.

BRIEF SUMMARY

A mobile data network supports making subscriber data addressable as devices in a mobile data network. Each data chunk is assigned a device address in the mobile data network. The data chunk can then be addressed as a device in the mobile data network. Data chunks corresponding to a subscriber are distributed across multiple devices in the mobile data network. The location of the subscriber's data chunks is tracked by the subscriber's mobile device and also by a tracking table in the mobile data network.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

As discussed above in the Background of the Invention section, while known mobile data networks can be used as a conduit for accessing cloud-based storage for subscribers, known mobile data networks do not offer support for storing subscriber data in the mobile data network. The mobile data network disclosed and claimed herein allows storing subscriber data in a mobile data network distributed across multiple devices in the mobile data network.

A mobile data network supports making subscriber data addressable as devices in a mobile data network. Each data chunk is assigned a device address in the mobile data network. The data chunk can then be addressed as a device in the mobile data network. Data chunks corresponding to a subscriber are distributed across multiple devices in the mobile data network. The location of the subscriber's data chunks is tracked by the subscriber's mobile device and also by a tracking table in the mobile data network.

Figure 1:
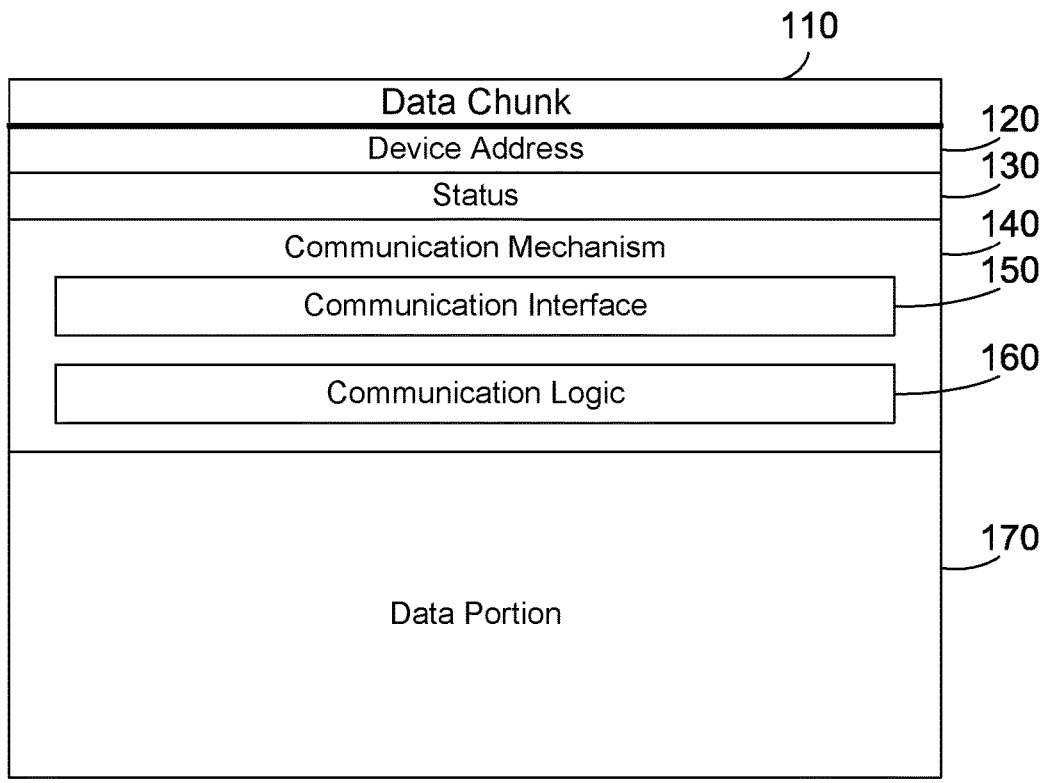
FIG. 1 is a block diagram of a data chunk that is addressable as a device in a mobile data network.

Referring to FIG. 1, a data chunk 110 represents any data that could exist in a mobile data network. Data chunk 110 is a data structure and includes no hardware. In one particular case, data chunk 110 represents data corresponding to a subscriber of the mobile data network. The data chunk 110 includes a device address 120 that makes the data chunk addressable as a device in the mobile data network. The data chunk may additionally include a status 130 that may include one or more pieces of information related to the status of the data chunk, as discussed in more detail below with reference to FIG. 13. Data chunk 110 also includes a communication mechanism 140. The communication mechanism 140 includes a communication interface 150 and communication logic 160. The communication interface 150 is used by a device in the mobile data network to request the data stored in the data chunk 110 using the device address 120. The communication logic 160 determines when and how the data chunk 110 delivers its data when a request for the data is received on the communication interface 150. The data portion 170 is subscriber data stored in the data chunk. When a device in the mobile data network needs to access the data portion 170 in data chunk 110, it sends a request to the communication interface 150 by using the device address 120, and in response, the data chunk 110 delivers the data portion 170 via the communication interface 150 according to the communication logic 160.

Figure 2:
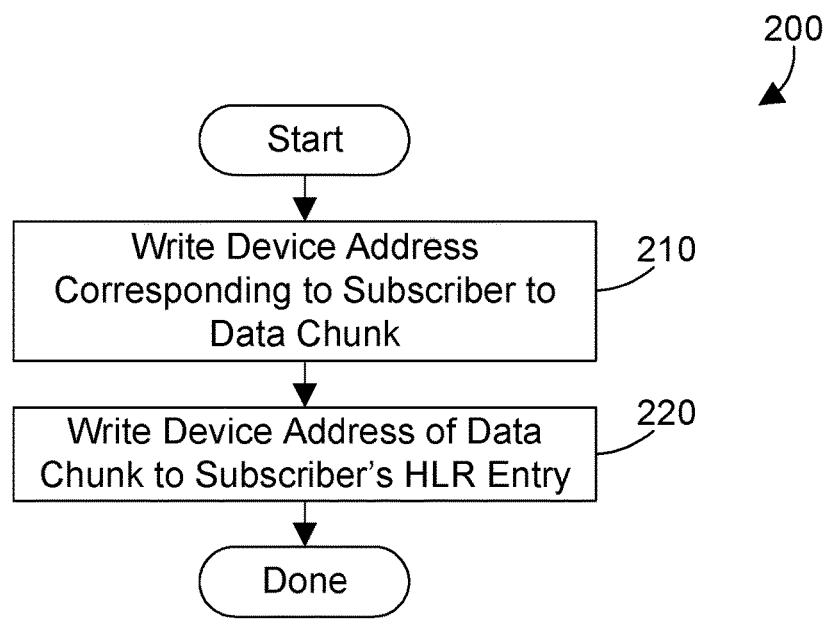
FIG. 2 is a flow diagram of a method for making a data chunk addressable as a device in a mobile data network.

FIG. 2 shows a method 200 for making a data chunk for a subscriber addressable in a known mobile data network, such as a 3G or 4G network. A device address corresponding to the subscriber is written as the device address of the data chunk (step 210). The device address of the data chunk is then written to the Home Location Register (HLR) entry for the subscriber (step 220). The HLR is well-known in 3G and 4G networks. By strategically using device addresses compatible with existing 3G and 4G networks, and recording the data chunk as a subscriber device in the HLR, a first implementation can use existing infrastructure in an existing 3G or 4G mobile data network to make the data chunk addressable as a device so the data can be retrieved when needed by a device in the mobile data network.

Figure 3:
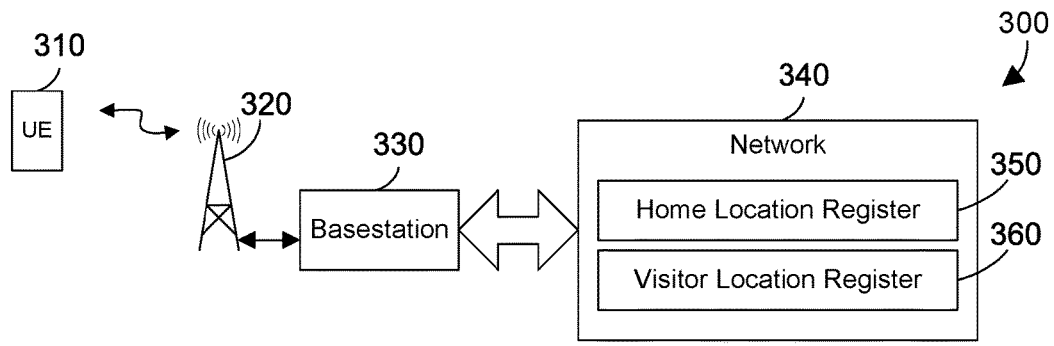
FIG. 3 is a block diagram showing a prior art mobile data network.

A prior art mobile data network 300 is shown in FIG. 3. User equipment 310, such as a smart phone, communicates with a tower 320, which communicates with a basestation 330. User equipment 310 can include any suitable device capable of communicating with tower 320. The basestation 330 is coupled to one or more components in the mobile data network. For the sake of illustration and simplicity, the portion of the network that communicates with the basestation 330 is shown in FIG. 3 as network 340, and can include any suitable number and type of components that exist in prior art mobile data networks. The network 340 includes a Home Location Register 350 and a Visitor Location Register 360. The Home Location Register 350 contains information regarding subscribers. The Visitor Location Register 360 contains information retrieved from a subscriber's Home Location Register 350 when the subscriber is outside his or her home network. The function of known Home Location Registers and Visitor Location Registers is well-known in the art, and therefore is not discussed in detail here.

Figure 4:
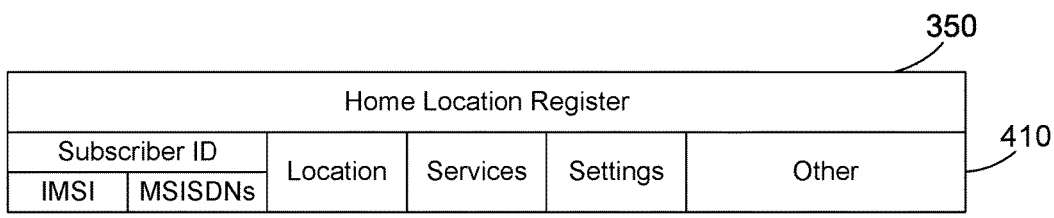
FIG. 4 is a diagram showing information that is included in prior art Home Location Register (HLR) entries.

Details of information that is stored in a Home Location Register (HLR) 350 are shown in FIG. 4. An entry 410 in the HLR for a subscriber can include a Subscriber ID, Location, Services, Settings and Other information, as shown in FIG. 4. The Subscriber ID typically includes an International Mobile Subscriber Identity (IMSI) and one or more Mobile Station International Subscriber Directory Number (MSISDNs). The IMSI is typically used as a key in the HLR while the MSISDN is the number normally dialed to connect a call to a mobile phone. An IMSI for a device does not change, while there may be multiple MSISDNs associated with an IMSI.

Figure 5:
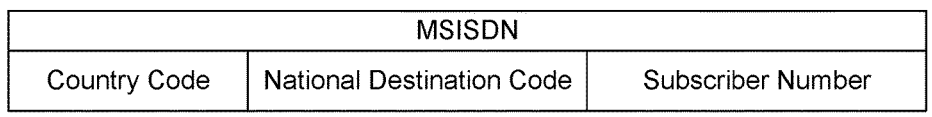
FIG. 5 is a diagram showing configuration for a known MSISDN.
Figure 6:
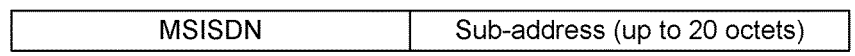
FIG. 6 is a diagram showing how a known MSISDN can have multiple sub-addresses.

As shown in FIG. 5, an MSISDN typically includes a Country Code, a National Destination Code, and a Subscriber Number. A feature of known MSISDNs that allows implementing data chunks addressable as devices is that an MSISDN may have a sub-address, as shown in FIG. 6. A sub-address can be up to twenty octets. This allows sub-addresses of an MSISDN to be used to address the subscriber's data chunks. Thus, if a subscriber has a smart phone and also has a tablet computer that both use the same subscription to the mobile data network, the sub-address could be used to differentiate between these two physical devices. By making data addressable as a device, the known methods for storing device information for a subscriber may be used to store information for data chunks for the subscriber.

Figure 7:
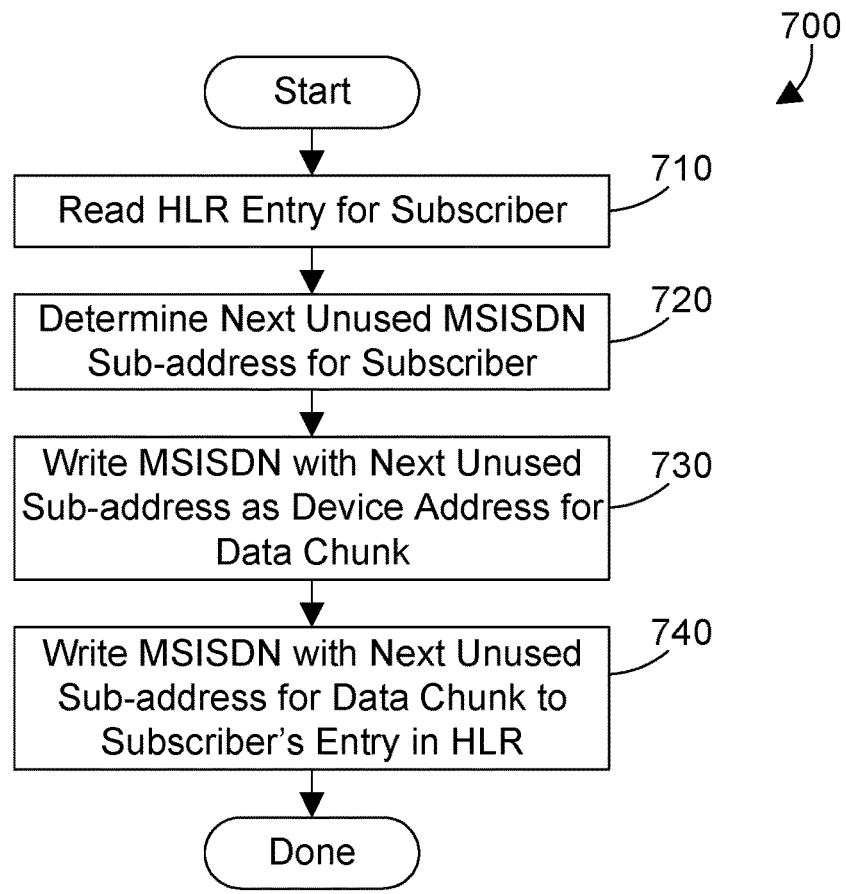
FIG. 7 is a flow diagram of a method for making a data chunk addressable as a device in a known mobile data network.

Referring to FIG. 7, a method 700 is preferably performed to make a data chunk for a subscriber addressable as a device in a mobile data network. The HLR entry for the subscriber is read (step 710). The next unused MSISDN sub-address for the subscriber is determined (step 720). This MSISDN with the next unused sub-address is then written as the device address for the data chunk (step 730). Referring again to FIG. 1, step 730 in FIG. 7 writes the MSISDN with the next unused sub-address to the device address 120 for data chunk 110. The MSISDN with the next unused sub-address that was written to the data chunk is then written to the subscriber's entry in the HLR (step 740). Writing the MSISDN and sub-address to the subscriber's entry in the HLR in step 740 effectively registers the data chunk as belonging to the subscriber, along with the device address needed to access the data chunk. While steps 720, 730 and 740 refer to the next unused MSISDN sub-address for the subscriber, any unused MSISDN sub-address could be used.

Figure 8:
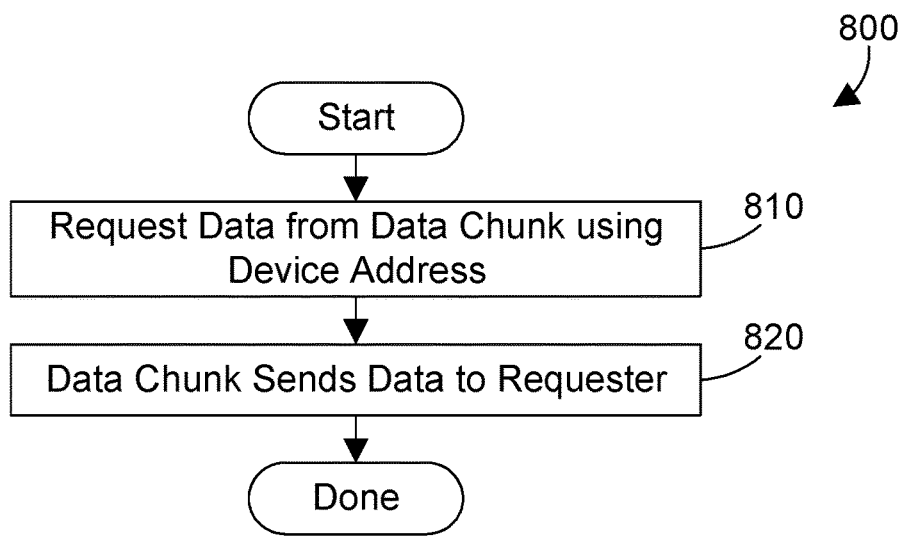
FIG. 8 is a flow diagram of a method for receiving data from a data chunk that is addressable as a device in a mobile data network.

FIG. 8 shows a method 800 for retrieving data from a data chunk that is addressable as a device. The data is requested from the data chunk using the device address of the data chunk (step 810). In response, the data chunk sends the data to the requester (step 820). There are numerous ways to implement method 800 in a mobile data network.

Figure 9:
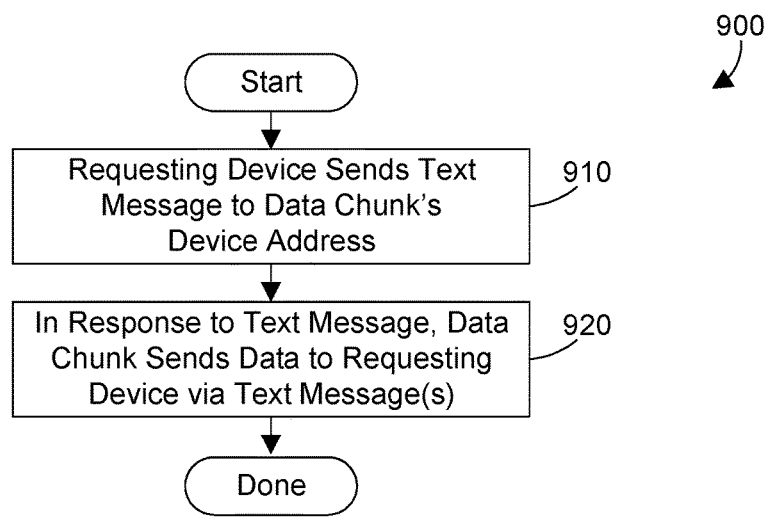
FIG. 9 is a block diagram of a method for receiving data from a data chunk that is addressable as a device in a prior art mobile data network.

One possible implementation for method 800 in FIG. 8 for an existing mobile data network, such as a 3G or 4G network, is shown as method 900 in FIG. 9. The requesting device sends a text message to the data chunk's device address (step 910). In response to the text message, the data chunk sends its data to the requesting device via one or more text messages (step 920). In one particular implementation, the data could be divided up into multiple chunks that can then be sent via sequential text messages, which could then be reassembled into the larger data portion by the device receiving the text messages. However, chopping the data into multiple portions that can be sent via text is not the only way to retrieve the data. With the ability to text photographs and other large files as attachments to a text message, the data chunk could simply send a text message with an attachment that includes the entire data portion of the data chunk. By making a data chunk addressable as a device, then sending a text message to the device to retrieve the data, the data chunks addressable as a device can be implemented within existing infrastructure in a mobile data network without any changes to hardware or software in the mobile data network.

Figure 10:
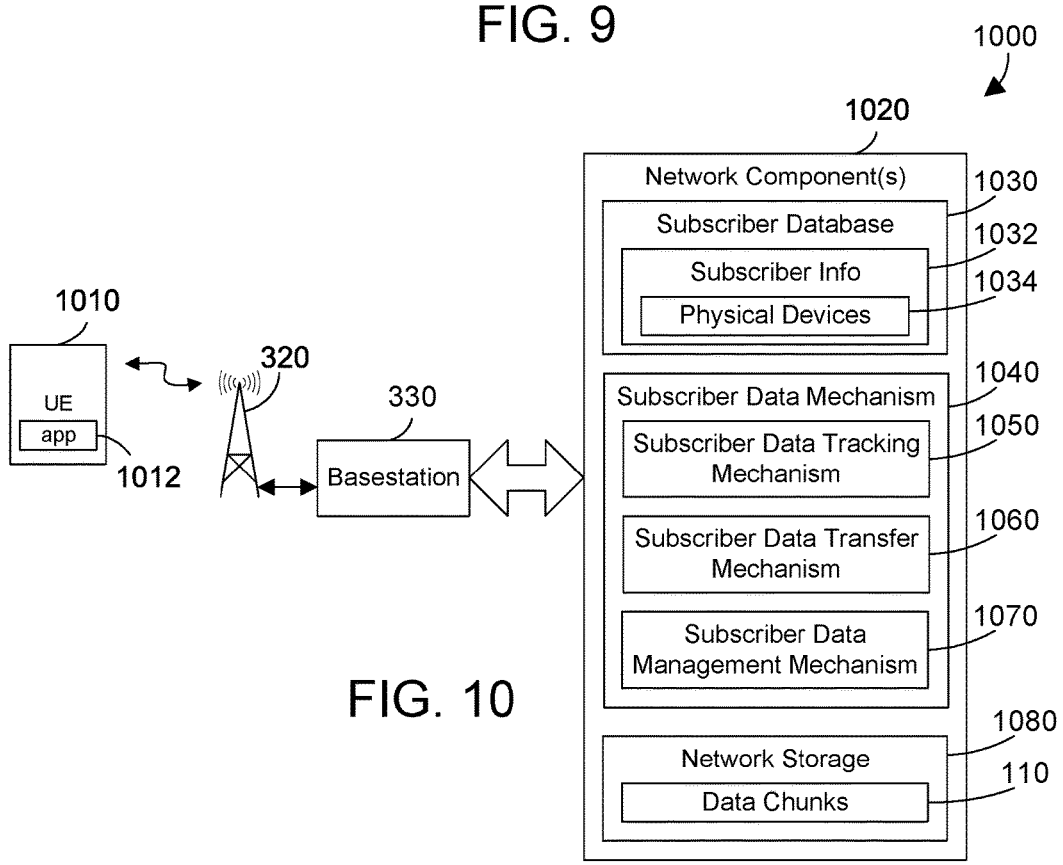
FIG. 10 is a block diagram of a mobile data network that includes a subscriber data mechanism that tracks, transfers and manages subscriber data in a mobile data network that is addressable as a device.

Using existing support for text messages in an existing mobile data network is a low-cost method of implementing the data chunks that are addressable as devices, but may not provide the desired function or performance. As a result, an alternative implementation of a mobile data network 1000 shown in FIG. 10 supports data chunks that are addressable as devices. The user equipment 1010 preferably includes an app 1012 that allows communicating between the user equipment 1010 and the subscriber's data chunks that are addressable as devices. The user equipment 1010 communicates with a tower 320, which communicates with a basestation 330, which communicates with one or more network components 1020. Note that 1020 in FIG. 10 represents one or multiple network components. Thus, the features shown as part of the network components 1020 in FIG. 10 could exist in different components in the mobile data network 1000. For example, the subscriber database 1030 could exist in a first network component, the subscriber data mechanism 1040 could exist in a second network component, and the network storage 1080 could exist in a third network component. FIG. 10 is simplified to show different functions that could be implemented in different network components in a mobile data network.

The subscriber database 1030 resides in one of the network components 1020. The subscriber database 1030 includes subscriber information 1032 that specifies which physical devices 1034 are registered to a subscriber. Because the data chunk disclosed herein includes a device address, the physical devices 1034 preferably specify addresses of actual physical devices and additionally specify device addresses of data chunks owned by the subscriber that are addressable as devices.

A subscriber data mechanism 1040 resides in one of the network components 1020. Subscriber data mechanism 1040 preferably includes a subscriber data tracking mechanism 1050, a subscriber data transfer mechanism 1060, and a subscriber data management mechanism 1070. The subscriber data tracking mechanism 1050 tracks where subscriber data chunks are stored. The subscriber data transfer mechanism 1060 transfers data in the mobile data network when needed. The subscriber data management mechanism 1070 manages subscriber data in the mobile data network. Network storage 1080 also resides in one of the network components 1020. Network storage 1080 may include one or more data chunks 110.

Figure 11:
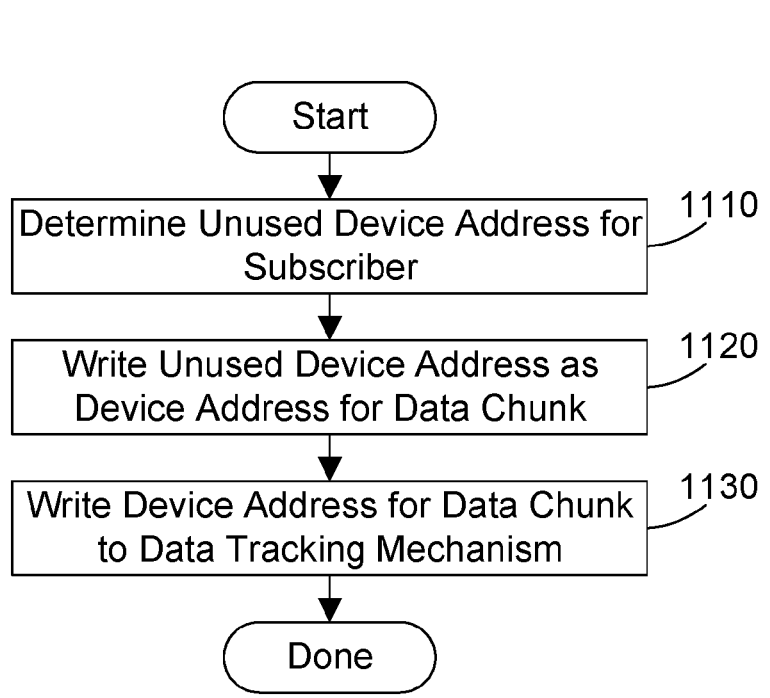
FIG. 11 is a flow diagram of a method for the subscriber data mechanism in FIG. 10 to make a data chunk addressable as a device in the mobile data network.

Referring to FIG. 11, a method 1100 determines an unused device address for a subscriber (step 1110). The unused device address is written as the device address for a data chunk (step 1120). The device address for the data chunk is then written to the data tracking mechanism (step 1130), such as data tracking mechanism 1050 shown in FIG. 10. Method 1100 illustrates the steps in assigning a device address to a data chunk and registering the device address of the data chunk with the data tracking mechanism, which can then keep track of the data chunk. Because the data chunk is addressable as a device, the network infrastructure in the mobile data network that allows registering devices to a subscriber will inherently support registering data chunks to a subscriber.

Figure 12:
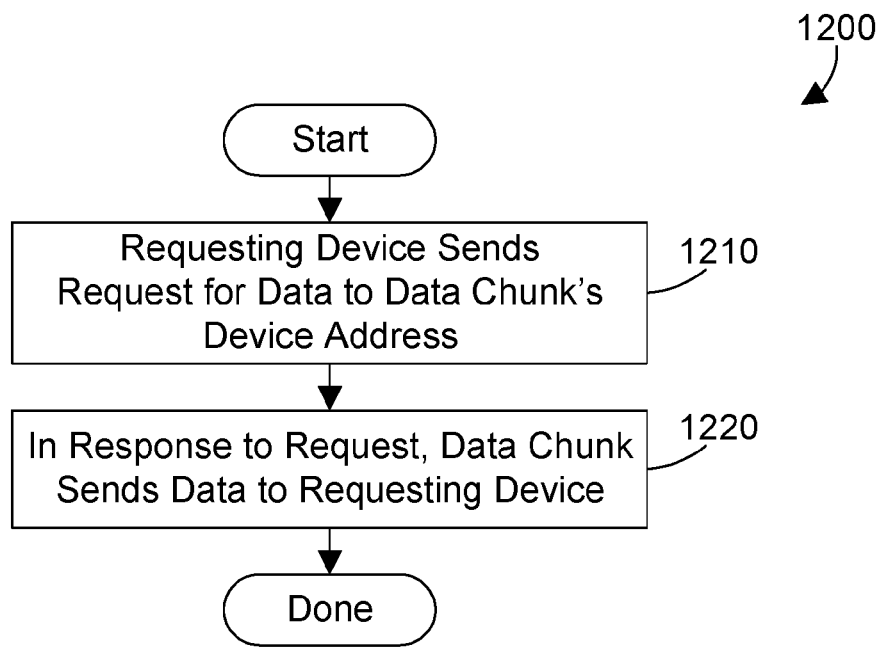
FIG. 12 is a flow diagram of a method for a device in a mobile data network to request data that is addressable as a device.

A method 1200 in FIG. 12 illustrates how data is retrieved from a data chunk. A requesting device sends a request for data to the data chunk's device address (step 1210). In response to the request in step 1210, the data chunk sends its data portion to the requesting device (step 1220).

Figure 13:
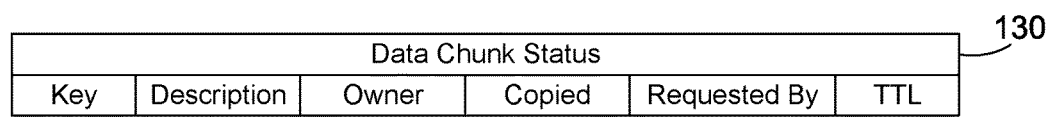
FIG. 13 is a diagram that shows examples of data that could be stored in the data chunk status field in FIG. 1.

Referring to FIG. 13, data chunk status 130 from FIG. 1 is shown to include several fields, which may include a key, a description, an owner, whether the data chunk is copied or not, users who requested the data chunk, and a time to live (TTL). Of course, other fields not shown in FIG. 13 could be included in the data chunk status 130. The "key" field provides a unique identifier that supports querying the data chunk status 130. The "Description" field includes a description of the data. Note the description could include multiple fields. One description field could indicate type of data stored, such as text, e-mail, audio, video, graphic, application, etc. Another description field could indicate the relationship of the data chunk to a larger whole. For example, a description field could indicate that the data chunk is the sixth chunk of nine data chunks of audio data that make up a song. Another description field could indicate a title for the data chunk, such as the title of the song of which the data chunk is part. Another description field could indicate whether the data portion of the chunk is encrypted or not. Another description field could include validation values, such as checksums, that may be used for data transfer verification.

The "Owner" field specifies the subscriber or user that owns the data chunk. Note the owner of the data chunk need not necessarily be a subscriber to the mobile data network. For example, the mobile data network may have an agreement with a competitor network that allows the subscribers in the competitor network to store data chunks in the mobile data network. In this case, the owner could be a user of the competitor's network that is not a subscriber of the mobile data network. Specifying the owner of the data allows the data chunk to be more effectively managed.

The "Copied" field indicates whether the data is original or whether it was copied. Copied data is sometimes referred to as "forked data" because it exists in two places at once. An example of copied data is a web page downloaded from a web site. The data at the original website is not altered, and any data downloaded from a web site is necessarily a copy of the web page information residing on the server of the web page information. Knowing whether a data chunk is original or copied allows the data chunk to be more effectively managed.

The "Requested By" field indicates subscribers or users who have requested the data chunk. The "TTL" field can be used to indicate a time to live for the data chunk, such as an expiration date and time, a number of uses, or any other suitable way to specify when the data chunk should be retained or when the data chunk can be deleted, including any specific threshold, criteria, algorithm or heuristic.

A simple example will illustrate. Let's assume the data chunk is part of a web page that has been proactively downloaded to the mobile data network in anticipation of the subscriber needing the information. For example, let's assume the subscriber accesses the cnn.com website each morning around 7:00 AM, and is finished reading the news by 7:30 AM. The subscriber data management mechanism 1070 in FIG. 10 could proactively download the home page from cnn.com at 6:45 AM each morning so the information is readily available to the subscriber. Let's assume the home page is contained in a single data chunk. The data chunk status 130 shown in FIG. 13 for this example would include a key, a description of the date (web page at cnn.com), the owner of the data (subscriber X), that the data is copied data, that the data was requested by subscriber X, and has a TTL of 7:45 AM so the web page can be discarded after the normal time when the subscriber will no longer need it. In another example, a subscriber's data chunk may be made available to other subscribers or users. In this case, the TTL could be dynamically set according to the way the data is accessed. For example, if a data chunk that includes news is requested by other users, the TTL value could be increased, and the TTL could then decrease once there are no more accesses to the data chunk. This scenario dynamically adjusts the TTL for a data chunk to account for how the data chunk is accessed. Once the data chunk is no longer needed, the TTL will decrease to zero, and the data chunk could then be discarded.

Figure 14:
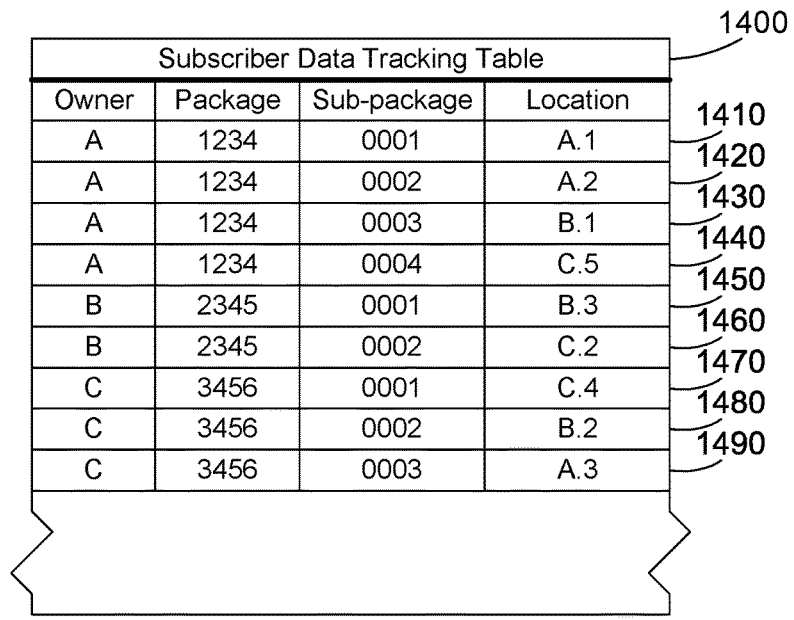
FIG. 14 is a table showing one suitable way for the subscriber data tracking mechanism in FIG. 10 to keep track of subscriber data in a mobile data network.

The subscriber data tracking mechanism 1060 in FIG. 10 preferably keeps track of subscriber data. One suitable way for the subscriber data tracking mechanism 1060 to track subscriber data uses a subscriber data tracking table 1400 shown in FIG. 14. The tracking table 1400 includes multiple entries that each specifies owner, package, sub-package, and location as shown in FIG. 14. Thus, entry 1410 specifies that subscriber A owns the data chunk, that the data chunk is sub-package 0001 of package 1234, and the data is stored in location A1, which could represent a location on a physical device used by subscriber A. Entry 1420 specifies that subscriber A owns the data chunk, that the data chunk is sub-package 0002 of package 1234, and the data is stored in location A2. Entry 1430 specifies that subscriber A owns the data chunk, that the data chunk is sub-package 0003 of package 1234, and the data is stored in location B1. This could mean that data chunks owned by subscriber A could be stored on a physical device from subscriber B. Entry 1440 specifies that subscriber A owns the data chunk, that the data chunk is sub-package 0004 of package 1234, and the data is stored in location C5. This could mean that data chunks owned by subscriber A could be stored on a physical device from subscriber C. Thus, the first four entries 1410, 1420, 1430 and 1440 indicate that four chunks that make up package 1234 belong to subscriber A, with two of the chunks stored on physical devices belonging to A, one of the chunks stored on a physical device belonging to subscriber B, and one of the chunks stored on a physical device belonging to subscriber C. Similarly, entries 1450 and 1460 show two data chunks owned by subscriber B that are stored on B's and C's devices, and entries 1470, 1480 and 1490 show three data chunks owned by subscriber C that are stored in A's, B's and C's devices. The subscriber data tracking table 1400 is one suitable tool that could be used by the subscriber data tracking mechanism 1050 in FIG. 10 for keeping track of what data is stored where. In addition, the subscriber data tracking table 1400 could be written to each mobile device that includes any of the sub-packages listed in the tracking table. Thus, for the specific example in FIG. 14, the subscriber data tracking table 1400 could be copied to the mobile devices for owner A, owner B, and owner C. In addition, the data tracking table 1400 could reside in network storage in the mobile data network that is not part of any mobile device used by any subscriber of the mobile data network, such as network storage 1080 shown in FIG. 10.

Figure 15:
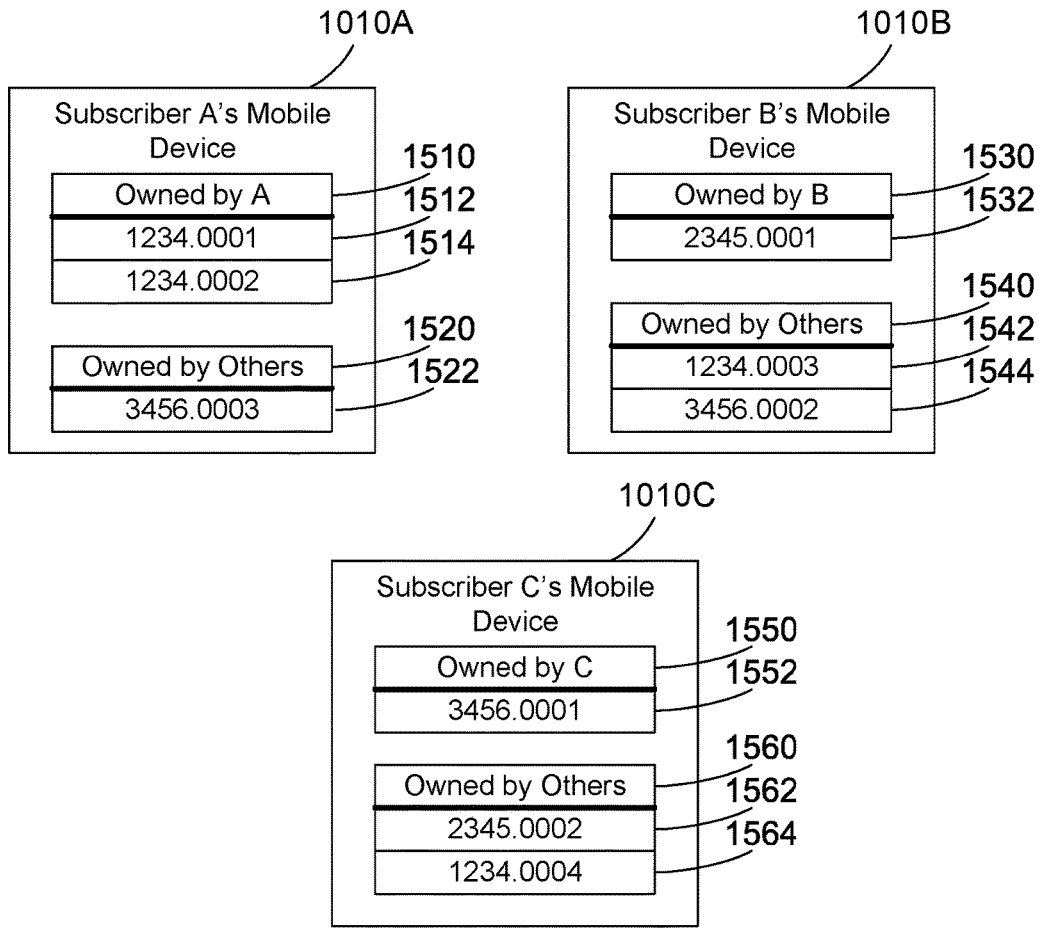
FIG. 15 is a block diagram showing subscriber data stored across multiple mobile devices.

FIG. 15 shows placement of data on different mobile devices as shown in the subscriber data tracking table 1400 shown in FIG. 14. Each mobile device includes storage for data chunks owned by the user (or subscriber) of the mobile device, and can additionally include storage for data chunks owned by other subscribers of other mobile devices. Thus, subscriber A's mobile device 1010A includes storage 1510 for data chunks owned by subscriber A and storage 1520 for data chunks owned by others. In the nomenclature used in this example, the identifier preceding a period represents a package name while the identifier following the period represents a sub-package name. Thus, 1234.0001 1512 shown in subscriber A's mobile device 1010A denotes sub-package 0001 of package 1234. In this specific example, data chunks 1234.0001 1512 and 1234.0002 1514 are data chunks owned by subscriber A, while data chunk 3456.0003 1522 is owned by subscriber C, as shown in the subscriber data tracking table 1400 in FIG. 14. Similarly, subscriber B's mobile device 1010B includes storage 1530 for data chunks owned by subscriber B and storage 1540 for data chunks owned by others. Data chunk 2345.0001 1532 is owned by subscriber B, while data chunks 1234.0003 1542 and 3456.0002 1544 are owned by subscribers A and C, respectively. In like manner, subscriber C's mobile device 1010C includes storage 1550 for data chunks owned by subscriber C and storage 1560 for data chunks owned by others. Data chunk 3456.0001 1552 is owned by subscriber C, while data chunks 2345.0002 1562 and 1234.0004 1564 are owned by subscribers B and A, respectively. Note that the subscriber data tracking table 1400 shown in FIG. 14 is preferably written to each of the mobile devices 1010A, 1010B and 1010C shown in FIG. 15. In this manner each mobile device knows from its own table the location of all data chunks on all three devices.

Figure 16:
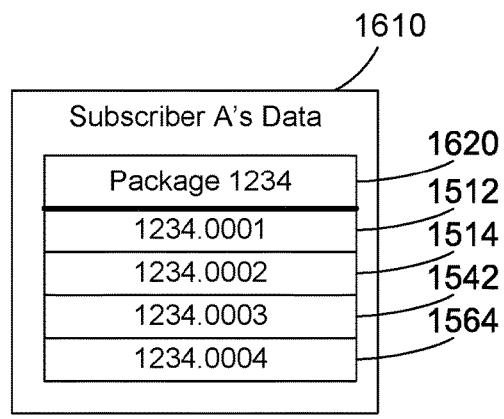
FIG. 16 is a block diagram showing how subscriber data may be parsed into different data chunks that are distributed among different devices in a mobile data network.

FIG. 14 shows that Owner A owns a package 1234 that includes sub-packages 0001, 0002, 0003 and 0004 that correspond to data chunks A1, A2, B1 and C5 respectively. This data package 1234 is shown graphically in FIG. 16. Subscriber A's data 1610 includes package 1234 1620, which includes the four individual data chunks 1512, 1514, 1542 and 1564. Note that data chunks A1 1512 and A2 1514 are stored in mobile device 1010A for subscriber A, data chunk B1 1542 is stored in mobile device 1010B for subscriber B, and data chunk C5 1564 is stored in mobile device 1010C for subscriber C, as shown in FIG. 15. FIG. 16 represents that a file or package can be parsed into multiple data chunks, and different parts of the data chunks can be stored on different devices in the mobile data network. While the specific example in FIGS. 14-16 shows subscriber data distributed over three mobile devices, this is shown by way of example and is not limiting. Any suitable number of mobile devices can be used. In addition, any suitable number of different components in the mobile data network can also be used to hold subscriber data, such as network storage 1080 shown in FIG. 10. Thus, the disclosure and claims herein extend to storing subscriber data across any suitable number and type of mobile devices and across any suitable number and type of components in the mobile data network.

Figure 17:
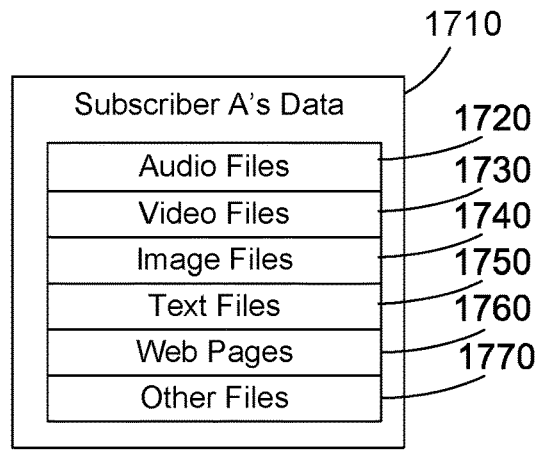
FIG. 17 is a table showing different file types for subscriber data that could be parsed into multiple data chunks.

Any type of file may be parsed into multiple data chunks that can then be stored on multiple devices in a mobile data network. FIG. 17 shows that subscriber A's data 1710 could include audio files 1720, video files 1730, image files 1740, text files 1750, web pages 1760 and other files 1770. Audio files can be quite large, and parsing an audio file into multiple data chunks as disclosed herein would allow different data chunks that make up an audio file to be stored on different devices in the mobile data network. Video files 1730 can be even significantly larger than most audio files, so parsing the video files into multiple data chunks allows the different chunks to be stored on different devices in the mobile data network. Image files 1740 can also be quite large, and would benefit from being parsed into multiple data chunks as described herein. Text files 1750 could also be parsed into multiple data chunks. Web pages 1760 can include text, links, images, audio files, video files, etc. So one of the web pages 1760 could be parsed into multiple data chunks. For example, a web page could have one data chunk for text, other data chunks for graphics, other data chunks for video files, etc. Other files 1770 generically represents any other type of file not otherwise listed in FIG. 17, whether currently known or developed in the future.

Figure 18:
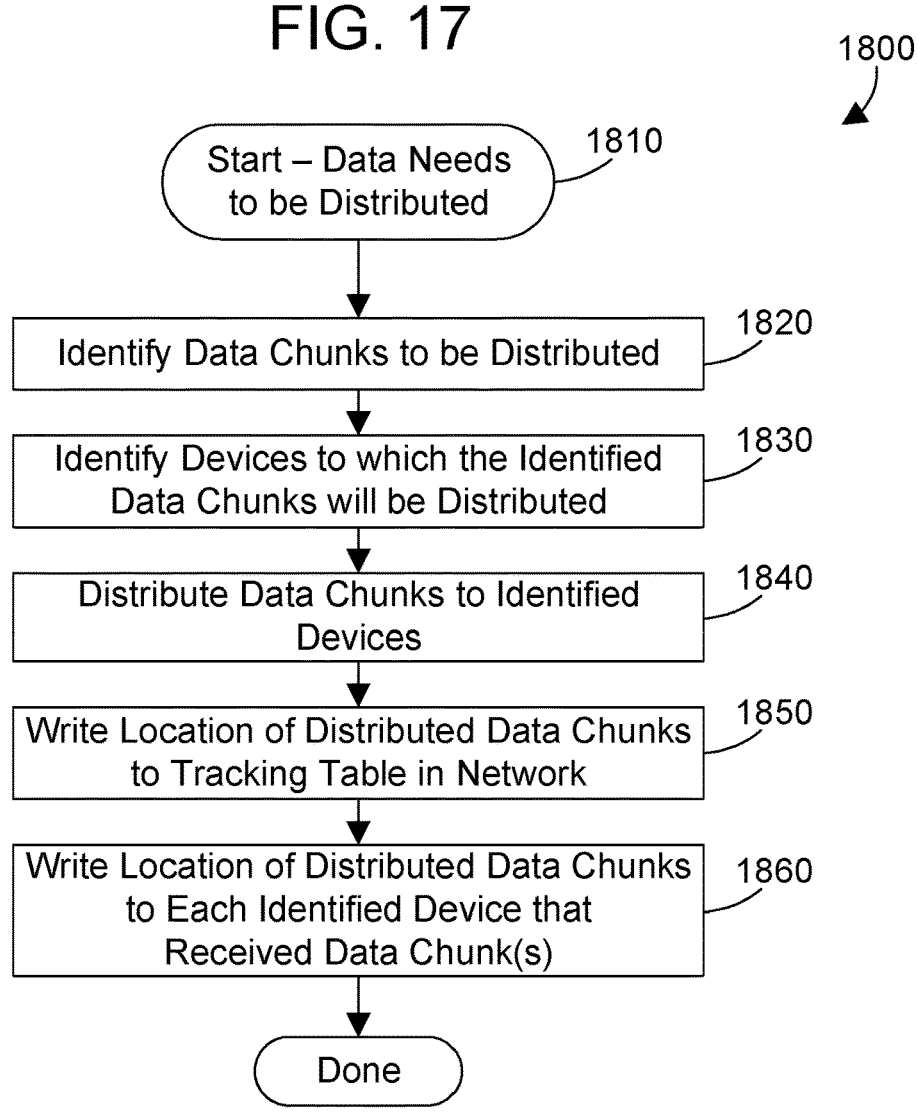
FIG. 18 is a flow diagram of a method for distributing subscriber data in a mobile data network.

Referring to FIG. 18, a method 1800 shows steps that can be performed to distribute data across different devices in a mobile data network. Method 1800 is preferably performed by the subscriber data mechanism 1040 shown in FIG. 10. In the alternative, method 1800 could be performed by an app 1012 on a mobile device 1010. Method 1800 begins when data needs to be distributed (step 1810). The data chunks to be distributed are identified (step 1820). The identification of data chunks in step 1820 can include identifying existing data chunks as well as generating new data chunks by parsing a file into multiple new data chunks. The data chunks can be part of the same file, or can be part of different files. The devices to which the identified data chunks will be distributed are then identified (step 1830). The data chunks are then distributed to the identified devices (step 1840). The location of the distributed data chunks is then written to a tracking table in the network (step 1850). The location of the distributed data chunks may also be written to each identified device that received data (step 1860). Method 1800 is then done.

Let's now review method 1800 to determine how it would work for the specific example shown in FIGS. 14-16. Referring to FIG. 14, we assume package 1234 owned by subscriber A is initially stored on the mobile device for subscriber A. In similar fashion, we assume package 2345 is initially stored on the mobile device for subscriber B, and package 3456 is initially stored on the mobile device for subscriber C. We assume that each mobile device for subscribers A, B and C runs an app 1012 as shown in FIG. 10 that allows the mobile devices to communicate with each other and share data with each other. We assume for this example that once all three apps on all three mobile devices communicate with each other, a determination is made that data needs to be distributed (step 1810). We assume for this example the packages 1234, 2345 and 3456 have not yet been parsed into sub-packages. So in response to determining that data needs to be distributed in step 1810, package 1234 is parsed into sub-packages 0001, 0002, 0003 and 0004; package 2345 is parsed into sub-packages 0001 and 0002; and package 3456 is parsed into sub-packages 0001, 0002 and 0003. For this example we assume each sub-package corresponds to a data chunk as described herein. Data chunks to be distributed are identified (step 1820). For the example in FIG. 14, we assume sub-packages 0003 and 0004 of package 1234 are identified to be distributed, sub-package 0002 of package 2345 is identified to be distributed, and sub-packages 0002 and 0003 of package 3456 are identified to be distributed in step 1820. The devices to which the identified data chunks will be distributed are then identified (step 1830). We assume for the example in FIG. 14 that decisions are made to distribute sub-package 0003 of package 1234 to subscriber B's mobile device, to distribute sub-package 0004 of package 1234 to subscriber C's mobile device, to distribute sub-package 0002 of package 2345 to subscriber C's mobile device, to distribute sub-package 0002 of package 3456 to subscriber B's mobile device, and to distribute sub-package 0003 of package 3456 to subscriber A's mobile device. The data chunks are then distributed to the identified devices (step 1840), with the result shown in FIG. 15. The location of the distributed data chunks is then written to a tracking table in the mobile data network (step 1850). For example, the subscriber data tracking table 1400 in FIG. 14 can be written to the network storage 1080 shown in FIG. 10. The location of the distributed data chunks is also written to each identified device that received one or more data chunks (step 1860). For example, the subscriber data tracking table 1400 in FIG. 14 can be written to each subscriber's mobile device. Thus, each mobile device 1010A, 1010B and 1010C could include the subscriber data tracking table 1400 shown in FIG. 14.

Note that the mobile devices can communicate with each other and with the subscriber data mechanism 1040 in the mobile data network using different networks. For example, for the example in FIG. 15, subscriber A's mobile device 1010A could communicate with the mobile data network and with subscriber B's mobile device 1010B and subscriber C's mobile device 1010C via a Wi-Fi connection, while mobile devices 1010B and 1010C communicate with subscriber A's mobile device and with the mobile data network using a data path in the mobile data network. The disclosure and claims herein extend to communicating between mobile devices and between the mobile data network using any suitable network or combination of networks.

Note also that data chunks could be copies of data retrieved from elsewhere. For example, a subscriber may access a web page, which could cause the web page to be copied to one or more data chunks owned by the subscriber. In this case, the data chunk owned by the subscriber is a copy, which means the data chunk could be discarded when the web page is no longer needed.

Data chunks are data structures that do not include any hardware. Making data chunks addressable as devices makes the data chunks appear as traditional physical devices that include hardware. In this manner data chunks can be addressed as if they are physical devices in the mobile data network.

A mobile data network supports making subscriber data addressable as devices in a mobile data network. Each data chunk is assigned a device address in the mobile data network. The data chunk can then be addresses as a device in the mobile data network. A first implementation allows accessing data in existing mobile data networks by sending a text message to the device address of the data chunk. When the data chunk receives a text message, it responds with one or more text messages that deliver the data in the data chunk to the sender who sent the text message. A second implementation includes a subscriber data mechanism in the mobile data network that supports tracking, transfer and management of subscriber data in the mobile data network. Making subscriber data addressable as a device simplifies data-centric communication in a mobile data network.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A mobile data network comprising:
   an antenna that communicates with user equipment;
   at least one basestation coupled to the antenna that communicates with the user equipment via the antenna;
   a plurality of data chunks residing in the mobile data network, each data chunk comprising:
      a device address that makes the data chunk addressable as a physical device in the mobile data network;
      a data portion corresponding to subscriber data for a subscriber;
   a network component coupled to the basestation, the network component comprising a subscriber database that includes information relating to physical devices used by the subscriber to access the mobile data network, wherein the information relating to physical devices used by the subscriber comprises the device address of the data chunk;
   a subscriber data mechanism residing in a component in the mobile data network that performs the steps of:
      identifying a plurality of data chunks corresponding to a selected subscriber in the mobile data network that comprise subscriber data to be distributed;
      identifying a plurality of devices in the mobile data network that each can receive at least one of the data chunks, wherein the identified plurality of devices comprises a plurality of mobile devices used by different subscribers of the mobile data network;
      distributing the plurality of data chunks to the plurality of devices;
      writing location of the plurality of data chunks to a tracking table in the mobile data network; and
      writing the location of the plurality of data chunks to each of the plurality of devices.

2. The mobile data network of claim 1 wherein the identified plurality of devices comprises a plurality of mobile devices used by different subscribers of the mobile data network.

3. The mobile data network of claim 1 wherein the identified plurality of devices comprises network storage in the mobile data network that is not part of any mobile device used by any subscriber of the mobile data network.

4. The mobile data network of claim 1 further comprising writing the location of the plurality of data chunks to each of the plurality of devices.

5. The mobile data network of claim 1 wherein each of the plurality of data chunks comprises a sub-portion of a larger file that comprises the subscriber data.

6. The mobile data network of claim 5 wherein a type of the larger file is selected from the group:
   audio files;
   video files;
   image files;
   text files;
   web pages; and
   other files.

7. The mobile data network of claim 1 wherein each data chunk further comprises a status that comprises a key and a description of the data chunk.

8. The mobile data network of claim 7 wherein the status further comprises owner of the data chunk.

9. The mobile data network of claim 8 wherein the status further comprises users who requested the data chunk.

10. A mobile data network comprising:
    an antenna that communicates with user equipment;
    at least one basestation coupled to the antenna that communicates with the user equipment via the antenna;
    a plurality of data chunks residing in the mobile data network, wherein each of the plurality of data chunks comprises a sub-portion of a larger file that comprises the subscriber data, each data chunk comprising:
       a device address that makes the data chunk addressable as a physical device in the mobile data network;
       a data portion corresponding to subscriber data for a subscriber;
       a communication mechanism that includes a communication interface for receiving requests for the data portion using the device address and for delivering the data portion of the data chunk; and
       a status that comprises:
          a key;
          a description of the data chunk;
          owner of the data chunk;
          at least one requester of the data chunk; and
          a time to live for the data chunk;
    a network component coupled to the basestation, the network component comprising a subscriber database that includes information relating to physical devices used by the subscriber to access the mobile data network, wherein the network component performs the steps of:
       determining an unused device address for the subscriber from the subscriber database;
       writing the unused device address to the device address of the data chunk;
       writing to an entry in the subscriber database corresponding to the subscriber the device address of the data chunk as one of the physical devices used by the subscriber;
    a subscriber data mechanism residing in a component in the mobile data network that performs the steps of:
       identifying a plurality of data chunks corresponding to a selected subscriber in the mobile data network that comprise subscriber data to be distributed;
       identifying a plurality of devices in the mobile data network that each can receive at least one of the data chunks, wherein the plurality of devices comprises:
          a plurality of mobile devices used by different subscribers of the mobile data network; and
          network storage in the mobile data network that is not part of any mobile device used by any subscriber of the mobile data network;
       distributing the plurality of data chunks to the plurality of devices;
       writing location of the plurality of data chunks to a tracking table in the network storage in the mobile data network; and
       writing the location of the plurality of data chunks to each of the plurality of mobile devices.

* * * * *